C. V. ESTEY & A. B. CUDNEY.
AUTOMATIC FLASH LAMP ATTACHMENT.
APPLICATION FILED JULY 29, 1916.
1,263,753.  Patented Apr. 23, 1918.
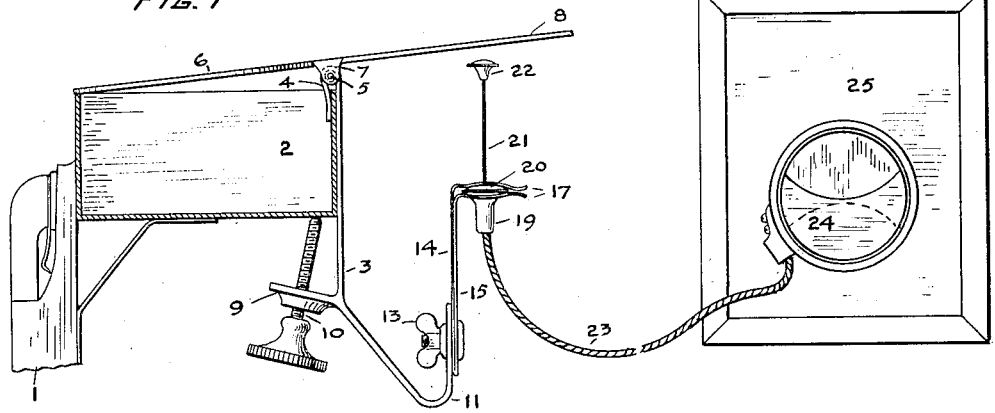
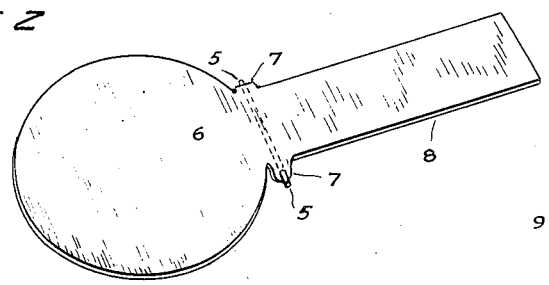
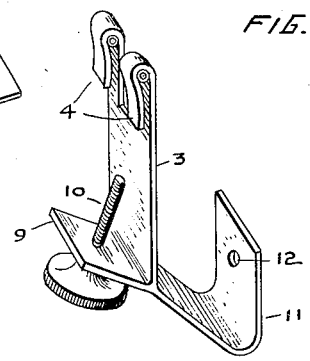
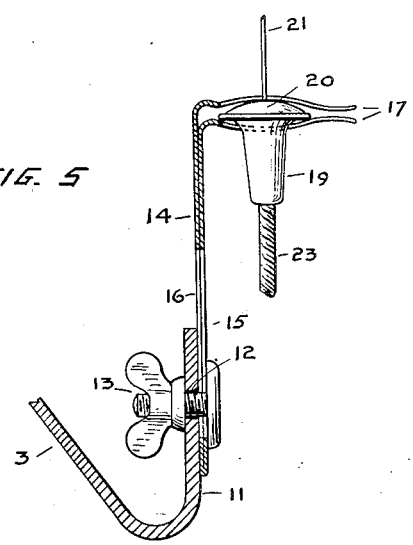
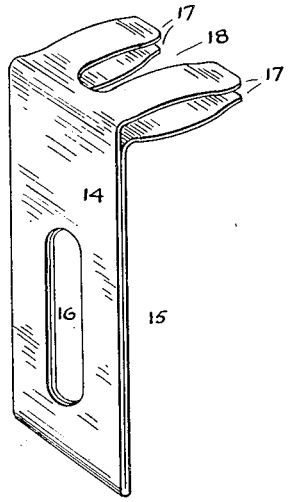
INVENTORS
C. V. ESTEY
A. B. CUDNEY
BY A. S. Paré
ATT'Y.

UNITED STATES PATENT OFFICE.

CHARLES V. ESTEY, OF OAKLAND, AND ANDREW B. CUDNEY, OF SAN FRANCISCO, CALIFORNIA.

AUTOMATIC FLASH-LAMP ATTACHMENT.

1,263,753.      Specification of Letters Patent.      Patented Apr. 23, 1918.

Application filed July 29, 1916. Serial No. 112,047.

*To all whom it may concern:*

Be it known that we, CHARLES V. ESTEY and ANDREW B. CUDNEY, citizens of the United States, residing, respectively, in the city of Oakland, county of Alameda, State of California, and in the city and county of San Francisco, same State, have invented certain new and useful Improvements in Automatic Flash-Lamp Attachments, whereof the following is a specification.

This invention relates to flash light guns for photographic use.

The invention consists in an attachment for the gun whereby the flash composition, in burning, automatically operates the camera shutter, so that the flash and the snap of the shutter are simultaneous.

In carrying out the invention we provide an attachment which may be quickly and easily connected to the flash lamp and which operates as above stated. In general terms, this attachment comprises a lid placed upon the flash powder holder, a bracket applied to the holder, and connected to, or supporting the lid, and a shutter operating device, also supported by said bracket and comprising a push rod and an extension of the lid to push the same. Said push rod, by means of a cable extending to the shutter, operates the shutter.

In the accompanying one sheet of drawing we have illustrated an apparatus containing our invention, the same being shown in connection with a conventionalized shutter and with the contiguous parts of the flash gun.

In the drawings:—

Figure 1 is an elevation showing a part of the flash gun, one of our attachments applied thereto, and a view of a camera shutter, the whole being connected and ready for use, the container being in section the better to show the manner of attaching the device to the gun.

Fig. 2 is a perspective top view of the lid which we apply to the flash container.

Fig. 3 is a perspective view of the bracket which connects and supports the various parts.

Fig. 4 is a perspective view of the bracket member which supports the push rod.

Fig. 5 is a sectional elevation showing the device of Fig. 4 as applied to the bracket, and supporting the push rod holder.

In these figures:—1 represents the main portion of a flash gun, and 2 the holder for the flash powder or other substance. 3 is a bracket, comprising the hooks 4 which engage the pintle 5 of the lid, and also hook over the edge of the holder 2, as clearly seen in Fig. 1. 6 is a lid applied to the top of the holder 2, and provided with the ears 7 to receive the pintle 5, and with the tail piece 8 for a purpose to be presently described. The bracket 3 is provided with a projecting member 9, which extends under the holder 2 and has a set screw 10, which, together with the hooks 4, secure it to the holder 2. At 11 is a recurved portion of the bracket, which has a hole 12 for the insertion of a set screw and thumb nut 13. The latter secures the bracket member 14, shown in Figs. 4 and 5. This member which is adjustable, comprises the upright part 15, slotted at 16 to receive the set screw 13 and permit adjustment aforesaid, and the lateral parts 17, which constitute holding fingers for the device to be next described. The member 14 may be made of a strip of spring metal folded upon itself, as seen particularly in Figs. 4 and 5, and the lateral parts kerfed as at 18, whereby four holding fingers are formed. 19 is a hollow clyinder having the flange or cap 20 at one end, which is engaged by the fingers 17. 21 is the push rod, operating in said cylinder, and having the push button 22 on its end. A section of cable, inclosed in the tube 23 is longitudinally operated by the rod 21, and works the camera shutter 24 on the camera 25.

Instead of operating the shutter as just described an electric switch may be connected to the member 14 and the shutter be actuated by an electric device.

In operation, when the flash charge is fired, the lid 6 is thrown upward more or less violently, and its extension 8 forces down the button 22 and rod 21, and thereby springs the shutter 24.

Having thus described our invention, and an embodiment of it, in the full, clear and exact terms required by law, and knowing that it comprises novel, useful and valuable improvements in the art to which it pertains, we here state that we do not wish to be limited to the precise construction and arrangement of the several parts, as herein set forth, as the same may be variously modified by a skilled mechanic without departing from the spirit of the invention.

What we claim and desire to secure by

Letters Patent of the United States, is the following, to wit:—

1. A camera attachment comprising a flash gun provided with a powder holder, a bracket secured to said powder holder and provided with a lid hinged thereon for said holder, a shutter operating device secured to said bracket and actuated by contact with said lid.

2. A camera attachment comprising a shutter operating device, a bracket for connecting said device to the flash gun, and a lid applied to the holder of the gun provided with an extension, said parts being so combined that at the opening of the lid said extension engages the shutter operating device and thereby actuates the shutter.

3. A camera attachment comprising a bracket adapted to hook over the edge of the flash powder holder, and to support a lid thereon, and adapted also to hold the shutter operating device in such contiguity to said lid as that the movement of the latter will actuate the former.

4. A camera attachment comprising a bracket adapted to be removably connected to the holder of a flash gun, and to support a lid thereon, said bracket having an adjustable member adapted to support the shutter operating device adjacent to said holder, said lid having an extension projecting over said shutter operating device and adapted to push the same.

5. In combination with the shutter operating device of a camera and the powder holder of a flash gun, a bracket mounted upon said holder and provided with means for supporting and operating said device.

6. In combination with the shutter operating device of a camera and the powder holder of a flash gun, a removable bracket secured to said holder and provided with adjustable clamping means engaging said shutter operating device, and means to operate the same.

7. In combination with the shutter operating device of a camera and the powder holder of a flash gun, a bracket provided with removable and adjustable fastening means engaging said holder and means on said bracket for supporting said device and a lid on said holder for operating said device.

8. In combination with the shutter operating device of a camera and the powder holder of a flash gun, a bracket secured to said holder, clamping means on said bracket for holding said operating device, and a lid pivotally mounted on said bracket for said holder, provided with an extension adapted to operate said device.

9. In combination with the push button of a shutter operating device for camera and the powder holder of a flash gun, a hinged lid for said holder provided with an extension adapted to engage said push button and thereby actuating said shutter.

In testimony that we claim the foregoing we have hereto set our hands, in the presence of two witnesses, this 24th day of July, 1916.

CHARLES V. ESTEY.
ANDREW B. CUDNEY.

Witnesses:
O. M. HART,
F. L. WOLFE.